US009327411B2

(12) United States Patent
Ganz et al.

(10) Patent No.: US 9,327,411 B2
(45) Date of Patent: May 3, 2016

(54) ROBOTIC GRIPPER

(76) Inventors: Brian L. Ganz, Carlsbad, CA (US);
Nicholas Pratte, San Marcos, CA (US);
James Hutchings, Carlsbad, CA (US);
Chinapong Songchan, Vista, CA (US)

( * ) Notice: Subject to any disclaimer, the term of this patent is extended or adjusted under 35 U.S.C. 154(b) by 797 days.

(21) Appl. No.: 13/324,626

(22) Filed: Dec. 13, 2011

(65) Prior Publication Data
US 2012/0239197 A1    Sep. 20, 2012

Related U.S. Application Data

(60) Provisional application No. 61/422,571, filed on Dec. 13, 2010.

(51) Int. Cl.
*B25J 13/08*    (2006.01)
*B25J 15/02*    (2006.01)
*B25J 9/16*    (2006.01)

(52) U.S. Cl.
CPC .............. *B25J 15/026* (2013.01); *B25J 9/1612* (2013.01)

(58) Field of Classification Search
CPC .. B25J 15/0004; B25J 15/026; B25J 15/0028; B25J 15/103; B25J 5/02; B25J 11/0095; B25J 13/085; B25J 15/0253; B25J 15/0273; B25J 15/08; B65G 49/07; B65G 49/08
USPC ......................................... 294/34; 901/31, 34
See application file for complete search history.

(56) References Cited

U.S. PATENT DOCUMENTS

| | | | | |
|---|---|---|---|---|
| 2,390,293 | A * | 12/1945 | Colson ....................... | 294/86.41 |
| 3,199,910 | A * | 8/1965 | Bradley ..................... | 294/119.1 |
| 4,598,942 | A * | 7/1986 | Shum et al. .................. | 294/106 |
| 4,600,357 | A * | 7/1986 | Coules .......................... | 414/730 |
| 4,707,013 | A * | 11/1987 | Vranish et al. .............. | 294/119.1 |
| 4,808,898 | A * | 2/1989 | Pearson ................... | 318/568.21 |
| 8,163,238 | B2 * | 4/2012 | Ganz et al. ..................... | 422/63 |
| 8,414,105 | B2 * | 4/2013 | Komuro et al. ................. | 347/37 |
| 2004/0186626 | A1 * | 9/2004 | Tsukamoto et al. .......... | 700/258 |
| 2007/0039831 | A1 * | 2/2007 | Townsend ..................... | 205/324 |
| 2009/0302626 | A1 * | 12/2009 | Dollar et al. ................. | 294/106 |

* cited by examiner

*Primary Examiner* — Thomas G Black
*Assistant Examiner* — Ce Li
(74) *Attorney, Agent, or Firm* — John R. Ross; John R. Ross, III (57) ABSTRACT

A robotic gripper. Each of two gripper fingers is attached to a bearing carriage. Each bearing carriage defines a rack gear and is adapted to ride on a bearing rail. A single pinion gear has two gear elements. Each of the two gear elements are meshed with one of the two rack gears so as to drive the two bearing carriages in opposite direction upon rotation of the pinion gear. A worm gear is fixed to the single pinion gear. A worm screw is meshed to the worm gear and adapted to cause rotation of the worm gear and the single pinion gear and a gripping action or a releasing action of the two gripping fingers, depending on the rotation of the worm screw. A motor is adapted to drive the worm screw in a first rotary direction and a second rotary direction.

12 Claims, 11 Drawing Sheets

FIG. 11

ROBOTIC GRIPPER

The present invention relates to robotic devices and, in particular, grippers for robotic devices. This application claims the benefit of Provisional Application 61/422,571 filed Dec. 13, 2010, which is incorporated by reference herein.

BACKGROUND OF THE INVENTION

Robotic grippers are known in the prior art. Prior art robotic grippers use a sensor located at the end of the robotic fingers to determine the presence of an object (such as a microwell plate). However, this method is very un-reliable due to reflections, or different color and shapes and materials of the objects that are being gripped.

Servo Motor Failure

Prior art grippers also utilize a servo motor to close the gripping fingers and hold the fingers in place. With a servo motor current is a function of torque, and current is used to keep the motor in position as heat continues to build up. With the prior art servo motor control method the motor heats up and failures are commonplace.

Worm Gears

Worm gears are know in the prior art. Worm gears are typically used when large gear reductions are needed. It is common for worm gears to have reductions of 20:1, and even up to 300:1 or greater.

Worm gears have an interesting property that no other gear set has: the worm can easily turn the gear, but the gear cannot turn the worm. This is because the angle on the worm is so shallow that when the gear tries to spin it, the friction between the gear and the worm holds the worm in place.

What is needed is a better robotic gripper.

SUMMARY OF THE INVENTION

The present invention provides a robotic gripper. Each of two gripper fingers is attached to a bearing carriage. Each bearing carriage defines a rack gear and is adapted to ride on a bearing rail. A single pinion gear has two gear elements. Each of the two gear elements are meshed with one of the two rack gears so as to drive the two bearing carriages in opposite direction upon rotation of the pinion gear. A worm gear is fixed to the single pinion gear. A worm screw is meshed to the worm gear and adapted to cause rotation of the worm gear and the single pinion gear and a gripping action or a releasing action of the two gripping fingers, depending on the rotation of the worm screw. A motor is adapted to drive the worm screw in a first rotary direction and a second rotary direction.

DETAILED DESCRIPTION OF THE PREFERRED EMBODIMENTS

Figure 1:
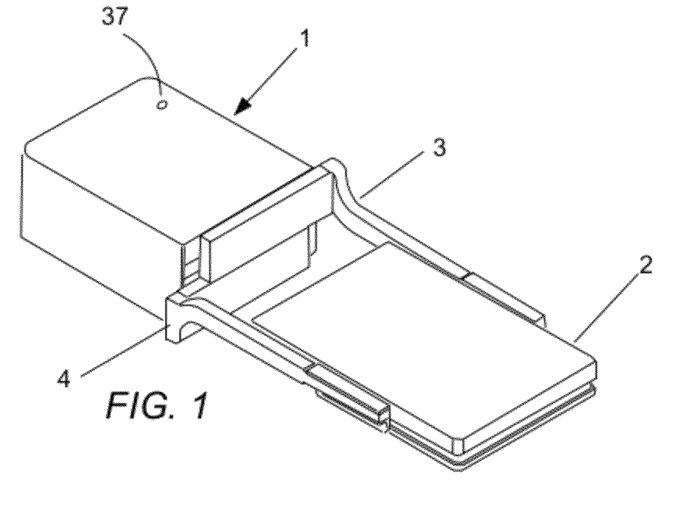
FIGS. 1-2 show a preferred embodiment of the present invention.
Figure 5:
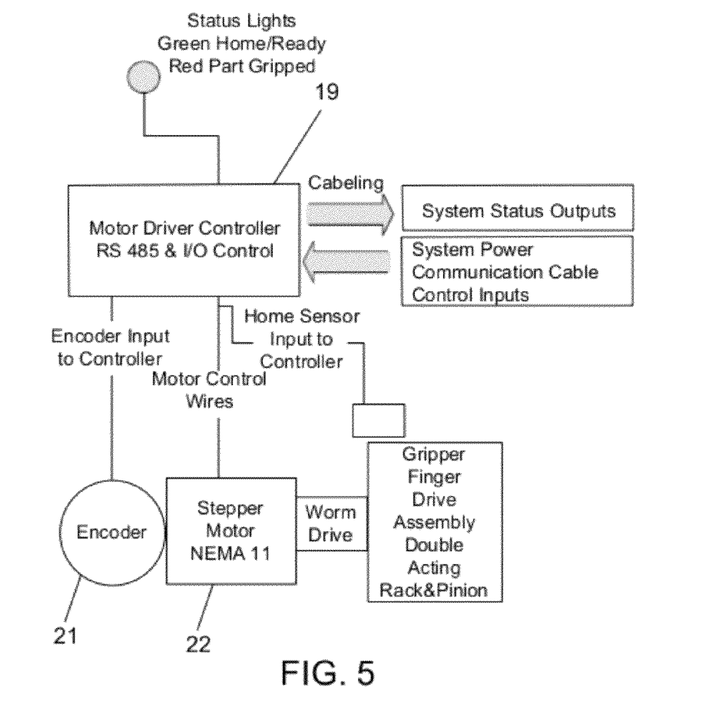
FIG. 5 shows a block diagram showing the components of a preferred gripper.
Figure 7:
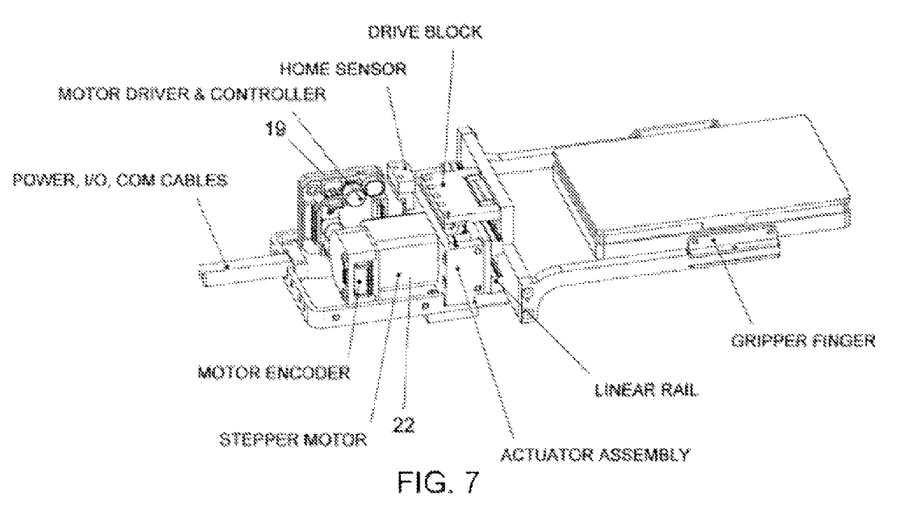
FIG. 7 shows a perspective view of a preferred gripper showing internal components.

In the present invention, gripper 1 (FIG. 1) uses force to detect the presence of an object (such as a microwell plate 2). This force is created by a small NEMA 11 size stepping motor 22 (FIGS. 5, 7) driving mechanical gears to make this force. A force detection point can be programmed into controller 19 software by the user to the user's specific requirements. Once the force detection value is met, power is held constant at the point of an object detection from stepper motor 22 and gripper fingers 3 and 4 are no longer driven inward any further by the motor.

Figure 2:
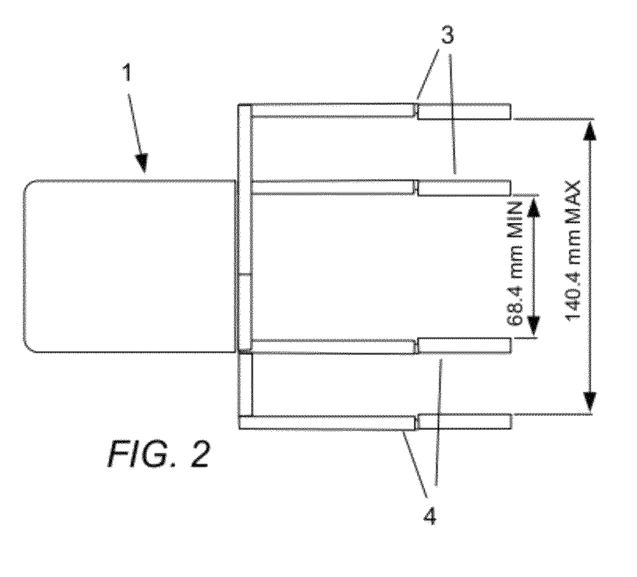

A preferred range of gripper finger separation is shown in FIG. 2. The range of gripper finger is sufficient so that a microwell plate may be gripped either in a portrait position or a landscaped position.

No Separate Sensor Required

Gripper 1 (FIGS. 1, 3) does not utilize a sensor attached to the ends of fingers 3 and 4 to detect microwell plate 2 being gripped. Instead, by utilization of encoder 21 feedback (FIG. 5), an error function that corresponds to a stalled stepper motor 22 condition is transmitted to the controller software of controller 19. When this event occurs, gripper 1 recognizes that it has grabbed an object. At this point an output signal is sent from gripper 1 to controller 11b via communication line 11c for robot 11 reporting that gripper 1 has grabbed an object and the robot arm can move. Preferably, this output from encoder 21 also turns on a red indicator light 37 on gripper 1 (FIG. 1) for a visual reference.

Control Through Electrical Inputs and Outputs

Figure 9:
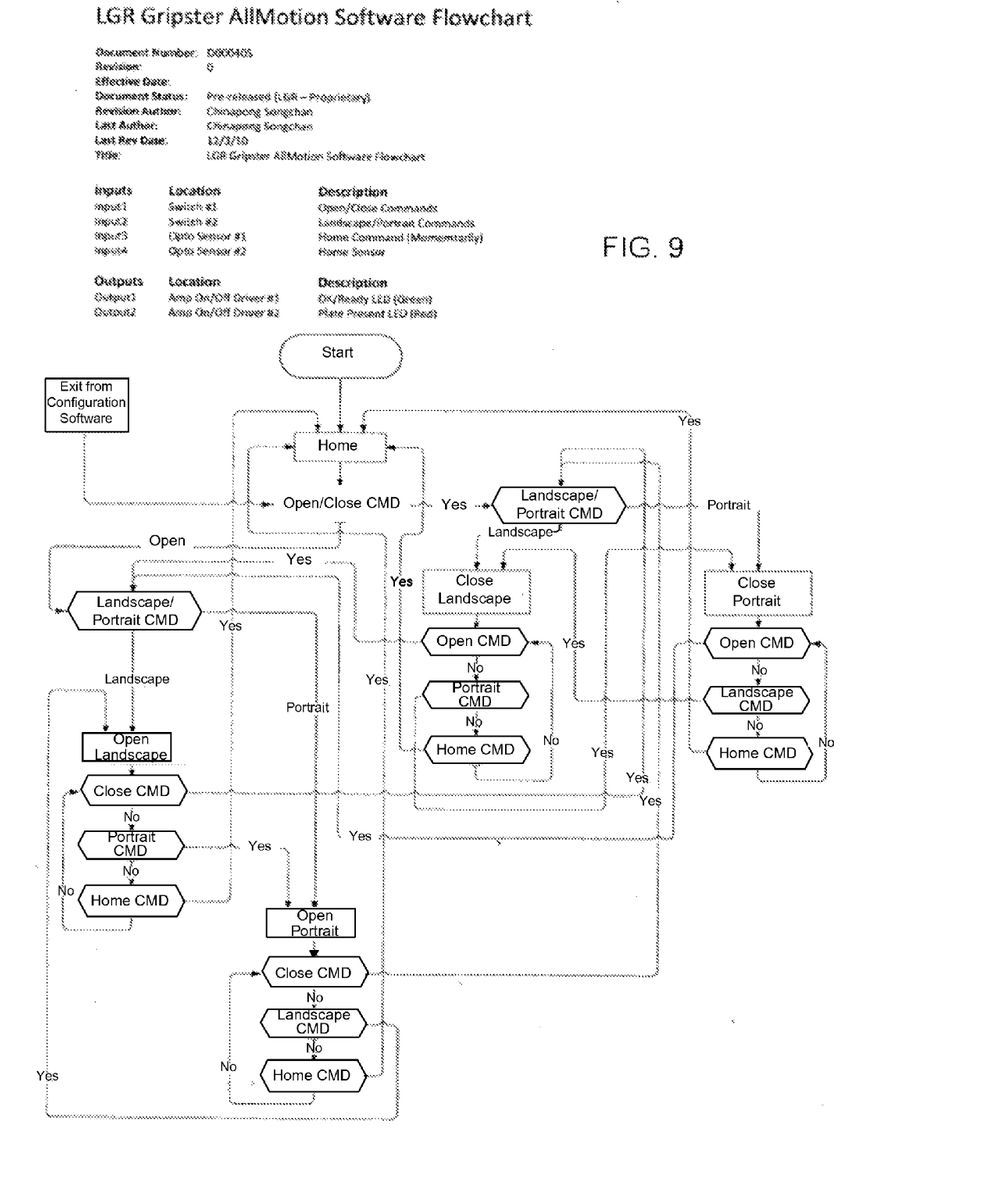
FIG. 9 shows a preferred flow chart for operation and control of a preferred gripper.

Gripper 1 is preferably controlled via electrical inputs and outputs. For example, FIG. 9 shows four inputs and two outputs. FIG. 9 also depicts a preferred operational flowchart for control of gripper 1.

Stepper Motor Utilization

The gripper uses a stepping motor 22, in contrast to the prior art servo motor. For example, in a preferred embodiment stepper motor 22 is a closed loop stepper motor. The stepper motor uses a rotary encoder, and AllMotion® controller 19. Hence, the driver only puts as much current into the motor as required to clamp the target microwell plate 2 at which point power to the motor is held constant leaving the plate clamped between fingers 3 and 4. In contrast with the prior art servo motor utilized for grippers, stepper motor 22 only utilizes a small amount of current and overheating is avoided. Also, as stated above, the utilization of stepper motor 22 means that an additional presence sensor is not required. When fingers 3 and 4 have together gripped the plate causing a stall of motor 22, a signal is sent to controller 19 automatically via stepper motor 22 as an error function signal which turns off power to the motor.

Gear Connections

Figure 8A:
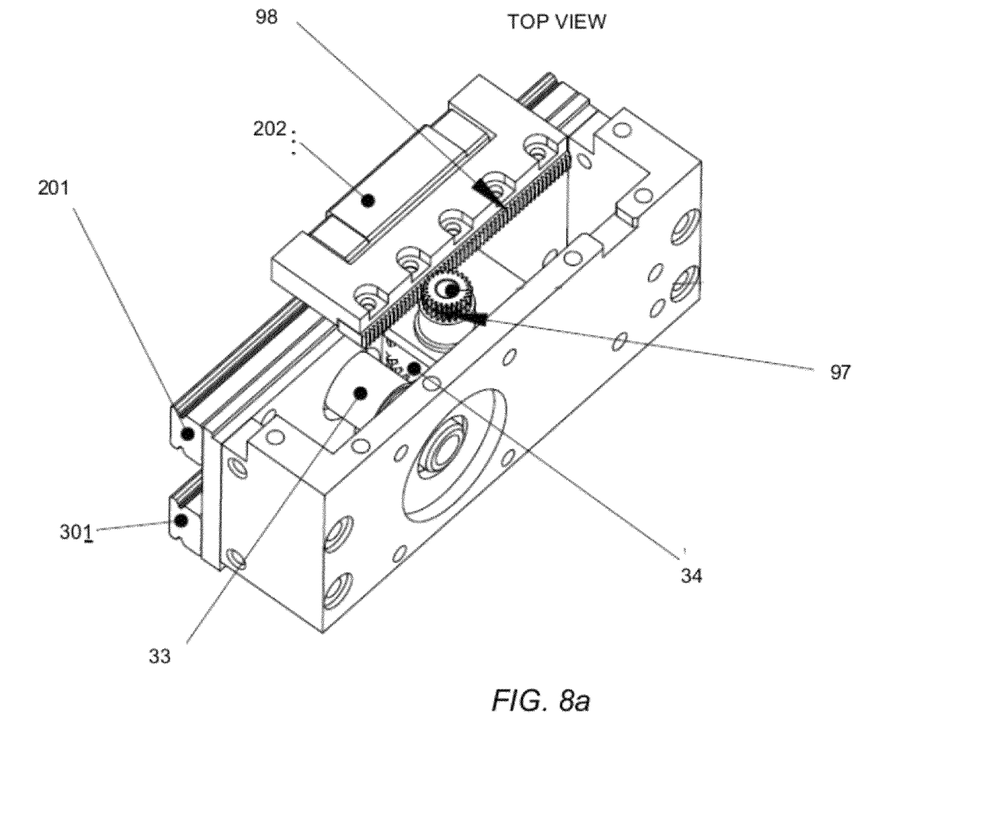
FIGS. 8a-8c show preferred gearing mechanisms of a preferred gripper.
Figure 8B:
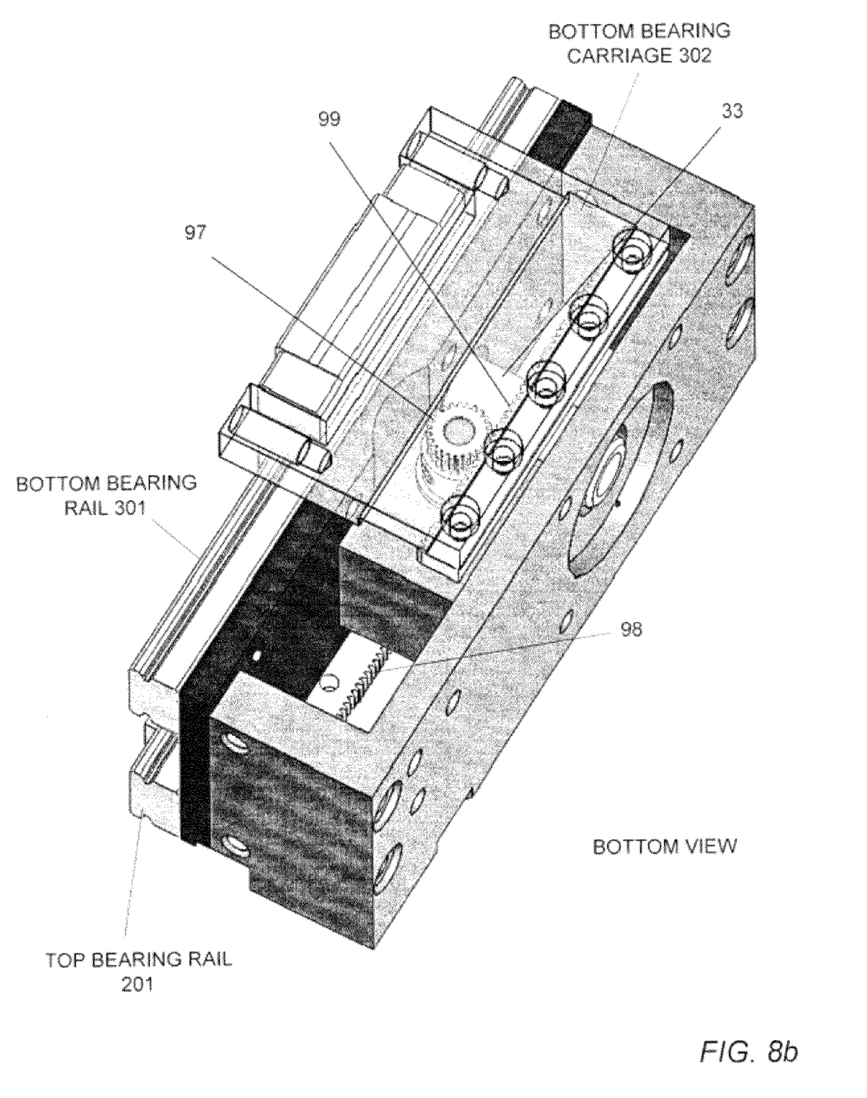
Figure 8C:
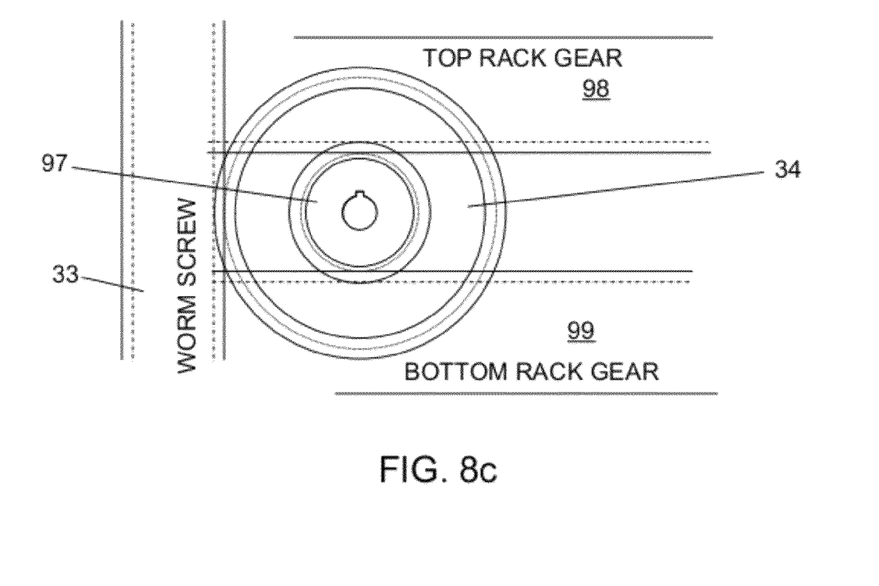

FIGS. 8a-8c show preferred gear connections. Pinion gear 97 is keyed to worm gear 34 as shown in FIG. 8c. Worm gear 34 meshes with worm screw 33 as shown in FIG. 8c. Rack gears 98 and 99 are meshed with pinion gear 97 as shown in FIG. 8a. Top bearing carriage 202 is connected to rack gear 97 and rides on top bearing rail 201 as shown in FIG. 8a. Bottom bearing carriage 302 is connected to rack gear 99 and rides on bottom bearing rail 301 as shown in FIG. 8b bottom view. Gripper finger 3 (FIG. 1) is connected to top bearing carriage 202 and gripper finger 4 is connected to bottom bearing carriage 302. Worm screw 33 drives worm gear 34 which in turn drives top rack gear 98 and 99 in opposite directions to open or close fingers 3 and 4.

Worm Drive

The gripper will not drop a plate if gripper 1 loses power or if controller 19 cuts power to stepper motor 22 after fingers 3 and 4 have gripped a microwell plate. This is due to the worm drive gearing along with the duel rack and pinion mechanical gearing. Worm screw 33 can easily turn worm gear 34, but when power is lost, worm gear 34 cannot turn worm screw 33 backwards (FIGS. 8a-8c). This is because the angle on the worm screw is so shallow that when the worm gear tries to spin it, the friction between the worm gear and the worm screw holds the worm screw in place and the microwell plate is not dropped.

Rack and Pinion Gears

FIGS. 8a-8c show pinion gear 97 engaged with rack gear 98 and rack gear 99. Rack gears 98 and 99 are mounted on opposite sides of pinion gear 97 as shown. This configuration allows for the opening and closing of the gripper fingers by the utilization of just one pinion gear.

Controlled Utilizing Remote Robot Control Computer and Control Screen

Figure 4:
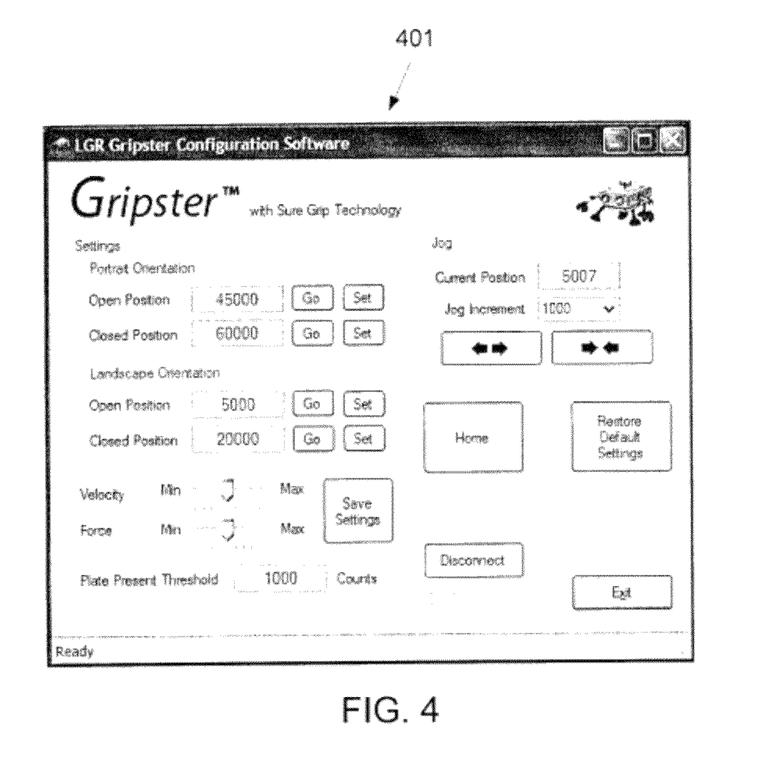
FIG. 4 shows a control screen for controlling a gripper via a computer.
Figure 11:
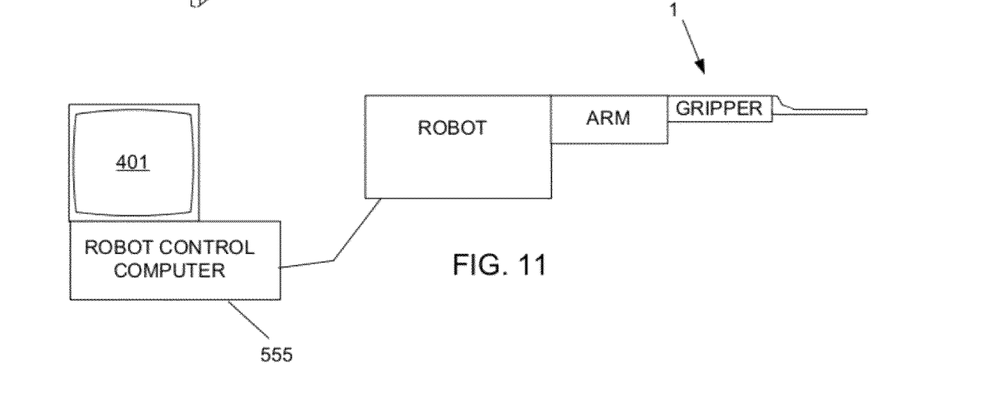
FIG. 11 shows a preferred gripper controlled by a remote robot control computer.

In a preferred embodiment of the present invention, gripper 1 is controlled utilizing a remote computer 555 and a control screen 401 (FIG. 11). In a preferred embodiment, control screen 401 is created utilizing Dynamic-link library (DLL). FIG. 4 shows details of a preferred control screen 401. Operating parameters for gripper 1 can be customized by an operator using control screen 401. For example, gripping force can be set as desired utilizing the control screen. A wide range of force can be setup on gripper 1 to pick up objects. The ability to vary the gripping force is utilized depending upon the width of the plate, whether it is lidded or unlidded and whether it is empty, partially full or full. Currently, in a preferred embodiment, the gripping force range is from a few ounces to over 50 lbs of force. As the motor size of stepper motor 22 (FIGS. 5 and 7) is increased, even greater force is achievable.

Stand Alone Control

Gripper 1 as shown and described above is fully self controlled. The only external inputs needed are DC electrical power from 12 to 24 VDC, less than 3 amps.

Manual Override

In a preferred embodiment, a manual override switch which runs the worm gear backward is attached to the back of gripper 1 to release the gripping force in the event of a failure.

Top Mount and Rear Mount

Figure 3:
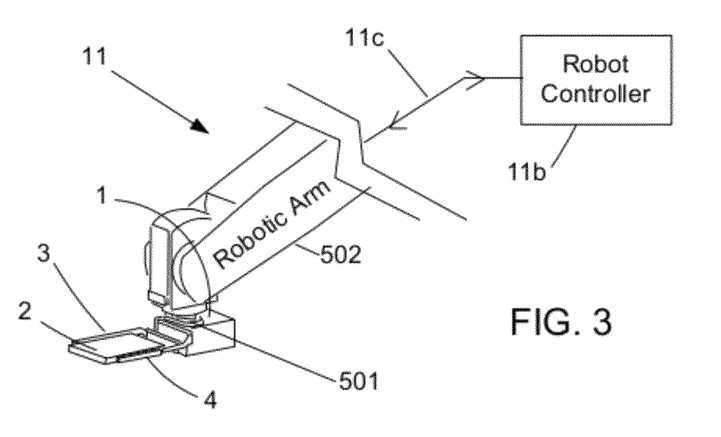
FIG. 3 shows a gripper connected to a robot via a top mount bracket.
Figure 6:
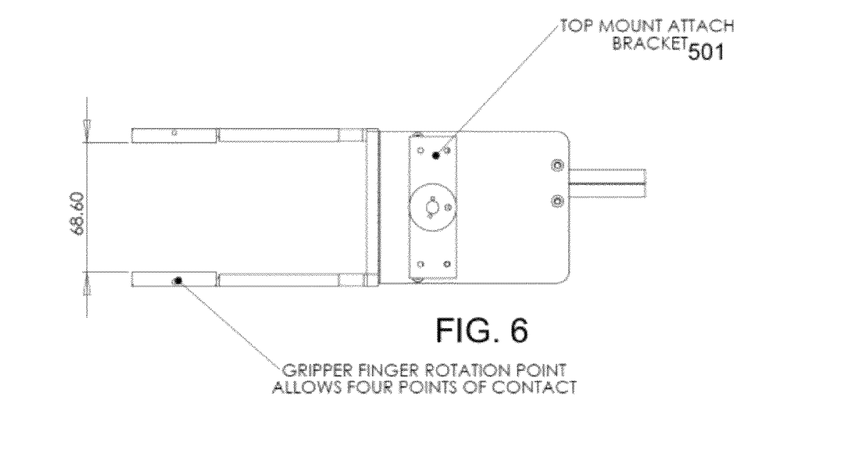
FIG. 6 shows a top mount attachment bracket and a gripper finger rotation point for permitting four points of contact.
Figure 10:
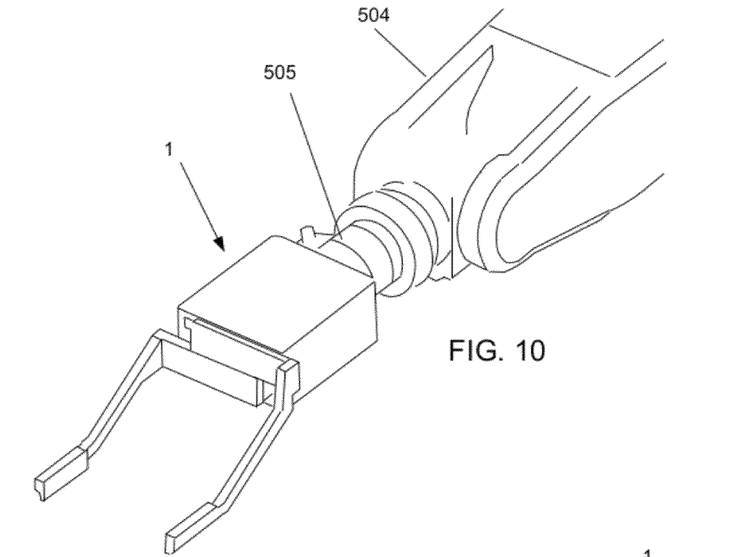
FIG. 10 shows a gripper connected to a robot via a rear mount bracket.

FIG. 3 shows gripper 1 mounted to robotic arm 502 of robot 11 via top mount bracket 501. Top mount bracket 501 is also shown in FIG. 6. It is also possible to mount gripper 1 via a rear mount bracket. For example, FIG. 10 shows gripper 1 mounted to robotic arm 504 via rear mount bracket 505.

Gripper Compatibility with Various Robots

Figure 12:
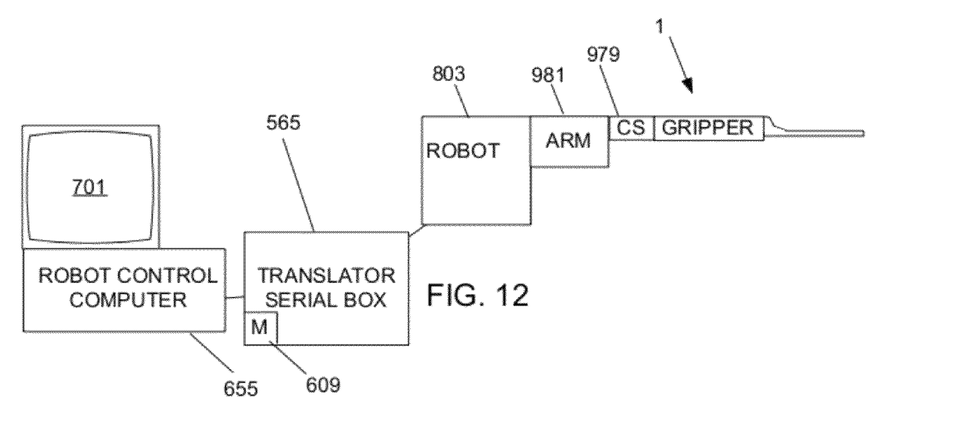
FIG. 12 shows the utilization of a translator serial box to translate command signals from a remote robot control computer to a preferred gripper.

Gripper 1 may be utilized with a variety of robots despite the programming code of the robots. For example, in FIG. 12 robot control computer 655 for robot 803 has been programmed utilizing a unique language not recognized by gripper 1. However, it is still possible to use gripper 1 with robot 803. Translator serial box 565 is inserted between robot 803 and robot control computer 655. Translator serial box 565 includes microcontroller 609. Microcontroller 609 has been programmed to recognize gripper control instructions transmitted from robot control computer 655. Translator serial box 565 translates the gripper control instructions to instructions recognizable by gripper 1. Translator serial box 565, similarly, has been programmed to translate and then transmit data information from gripper 1 back to robot control computer 655. By utilizing translator serial box 565 in conjunction with gripper 1, a user can attach gripper 1 to virtually any robot that has the capability to grip objects despite the specific programming of the robot. This is a very valuable feature of the present invention because it means that robots that utilize gripper 1 do not have to be reprogrammed to accept and control gripper 1.

Collision Sensor

In a preferred embodiment of the present invention collision sensor 979 is positioned between gripper 1 and robot arm 981. Preferably a mechanical switch and air pressure is utilized to set the trip point of sensor 979. The gripper detects an impact when the trip point of the sensor has been met. After an impact has been detected, robot control computer 655 is preferably programmed to halt the movement of robot 803 to avoid any damage to gripper 1 or the object being gripped.

Although the above-preferred embodiments have been described with specificity, persons skilled in this art will recognize that many changes to the specific embodiments disclosed above could be made without departing from the spirit of the invention. Therefore, the attached claims and their legal equivalents should determine the scope of the invention.

What is claimed is:
1. A robotic gripper for gripping a target, comprising:
   A) two gripper fingers, each of said two gripper fingers being attached to a bearing carriage, each bearing carriage defining a rack gear and adapted to ride on a bearing rail and grip the target,
   B) a single pinion gear having two gear elements each of the two gear elements being meshed with one of the two rack gears so as to drive the two bearing carriages in opposite direction upon rotation of the pinion gear,
   C) a worm gear fixed to the single pinion gear,
   D) a worm screw defining a shallow screw angle and meshed to the worm gear and adapted to cause rotation of the worm gear and the single pinion gear and a gripping action or a releasing action of said two gripping fingers, depending on the direction of rotation of said worm screw, and E) a programmable controller programmed to control the motion of said gripper fingers, F) a stepper motor adapted to drive said worm screw in a first rotary direction and a second rotary direction, said stepper motor being adapted to stall when the gripper fingers have gripped the target, and;

G) an encoder means connected between the stepper motor and the controller, for sending a signal to the controller to indicate when the gripper fingers have grabbed the target so that only as much current is put into the motor as required to clamp the target so that overheating is avoided;

wherein when the fingers have gripped the target causing the stepper motor to stall, a signal is sent to the controller via the stepper motor and the controller turns off the power to the motor and wherein, the shallow screw angle on the worm screw is so shallow that in the event of a loss of power to the stepper motor and the worm gear tries to spin the worm screw, friction, between the worm gear and the worm screw, holds the worm screw in place and the target is not dropped.

2. The robotic gripper as in claim 1, wherein said worm gear holds said gripper fingers in place to continuously apply the gripping force after power has been cut from said motor.

3. The robotic gripper as in claim 1, wherein said robotic gripper displays an indicator light after said force detection point has been met.

4. The robotic gripper as in claim 1 wherein said gripper fingers are configured to grip a microwell plate.

5. The robotic gripper as in claim 1 wherein said gripper fingers are configured to grip a microwell plate in either a landscape position or a portrait position.

6. The robotic gripper as in claim 1, wherein said robotic gripper is controlled via input/output instructions.

7. The robotic gripper as in claim 4 wherein said input/output instructions are manually entered by an operator utilizing at least one control switch.

8. The robotic gripper as in claim 1, wherein said robotic gripper is controlled via a remote robot control computer and control screen.

9. The robotic gripper as in claim 1 further comprising a top mount bracket attached to said robotic gripper for mounting said gripper to a robot.

10. The robotic gripper as in claim 1 further comprising a rear mount bracket attached to said robotic gripper for mounting said gripper to a robot.

11. The robotic gripper as in claim 1, further comprising a translator serial box connected between a remote robot control computer and said robotic gripper wherein said translator serial box is programmed to translate gripper control instructions generated by said remote robot control computer to a language understood by said robotic gripper, wherein said translator serial box enables said robotic gripper to be connected to a remote robot and controlled by said remote robot control computer even though said remote robot control computer is programmed to communicate in a language other than the language understood by said robotic gripper.

12. The robotic gripper as in claim 1, wherein said robotic gripper is connected to a robot, further comprising a collision sensor positioned between said gripper and said robot, wherein said collision sensor sends a signal to halt the motion of said robot after a collision has been detected.

* * * * *